(12) United States Patent  
Shim

(10) Patent No.: US 9,253,477 B2
(45) Date of Patent: Feb. 2, 2016

(54) DISPLAY APPARATUS AND METHOD FOR PROCESSING IMAGE THEREOF

(75) Inventor: Jae-young Shim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 399 days.

(21) Appl. No.: 13/188,863

(22) Filed: Jul. 22, 2011

(65) Prior Publication Data

US 2012/0069155 A1    Mar. 22, 2012

(30) Foreign Application Priority Data

Sep. 17, 2010 (KR) .................. 10-2010-0091651

(51) Int. Cl.
*H04N 13/00* (2006.01)
*H04N 13/04* (2006.01)

(52) U.S. Cl.
CPC ....... *H04N 13/0425* (2013.01); *H04N 13/0048* (2013.01); *H04N 13/0051* (2013.01); *H04N 13/0059* (2013.01); *H04N 13/0497* (2013.01); *H04N 2213/007* (2013.01)

(58) Field of Classification Search
CPC ............................. H04N 17/00; H04N 9/475
USPC .......................................... 348/192, 181, 241
See application file for complete search history.

(56) References Cited

U.S. PATENT DOCUMENTS

| 5,446,492 A | * | 8/1995 | Wolf et al. ................ 348/192 |
| 5,856,843 A | * | 1/1999 | Muramoto ................ 348/52 |
| 8,208,790 B2 | * | 6/2012 | Toma et al. ................ 386/241 |
| 2004/0218269 A1 | * | 11/2004 | Divelbiss et al. ............ 359/464 |
| 2007/0285663 A1 | | 12/2007 | Hewitt et al. |
| 2009/0040311 A1 | * | 2/2009 | Okamoto et al. ............ 348/181 |

FOREIGN PATENT DOCUMENTS

| EP | 0474420 A2 | 3/1992 |
| EP | 0716330 A2 | 6/1996 |
| WO | 2004066203 A2 | 8/2004 |

OTHER PUBLICATIONS

Communication dated Aug. 6, 2013 issued by the European Patent Office in counterpart European Application No. 11178466.6.

* cited by examiner

*Primary Examiner* — Jay Patel
*Assistant Examiner* — Frank Huang
(74) *Attorney, Agent, or Firm* — Sughrue Mion, PLLC

(57) ABSTRACT

A display apparatus and method for processing an image in a display apparatus are provided. The display apparatus includes a display unit, a receiving unit which receives a frame image including a first image and a second image and sync information of the frame image, a determination unit which determines whether the frame image is consistent with a reference pattern using the sync information, and an image processing unit which, if the frame image is inconsistent with the reference pattern, adjusts the frame image based on a level of inconsistency, and a controlling unit which controls the display unit to display the adjusted frame image.

16 Claims, 13 Drawing Sheets

DISPLAY APPARATUS AND METHOD FOR PROCESSING IMAGE THEREOF

CROSS-REFERENCE TO RELATED APPLICATIONS

This application claims priority from Korean Patent Application No. 2010-0091651, filed in the Korean Intellectual Property Office on Sep. 17, 2010, the disclosure of which is incorporated herein by reference in its entirety.

BACKGROUND

1. Field

Apparatuses and methods consistent with exemplary embodiments relate to a display apparatus and a method for processing an image thereof, and more particularly, to a display apparatus which is capable of displaying a three-dimensional (3D) image by adjusting for a received image and a method for processing an image thereof.

2. Description of the Related Art

Recently, with the development of electronic technology, home appliances such as televisions have been developing rapidly. Particularly, in the field of television apparatuses, 3D television (TV) technology, which provides a sense of vividness and reality by adding depth to a two-dimensional (2D) mono image, thereby allowing a viewer to perceive an audio and a visual stereoscopic sense, has developed quickly.

The 3DTV broadcast technology is a technology which creates additional information from a 2D image by applying a viewer's two eyes and stereoscopic vision technology, and uses the additional information to provide a viewer with a sense of vividness and reality as if the viewer is actually in a space where the image is being created.

Many international exhibitions and events display exhibition facilities employ this 3D image technology, and thus a viewer can enjoy wonderful stereoscopic images. Sometimes, a 3D image, which gives a totally different effect from a two-dimensional image, is so realistic that a viewer tries to reach for the image by stretching his or her arms or unconsciously tries to escape from an approaching subject in the image.

A television may display a 3D image by dividing a received image into a left eye image and a right eye image and performing image processing on the divided left eye and right eye images.

The television may receive an image from an outside source using various interfaces.

If the television receives an image through a digital interface, the television may divide the received image exactly into the left eye image and the right eye image to display a 3D image.

However, if the television receives an image through an analog interface, the size or location of the received image may be changed, and thus it is difficult to divide the received image exactly into a left eye image and the right eye image. Accordingly, if an image is received through an analog interface, a 3D image may not be displayed normally.

SUMMARY

Exemplary embodiments relate to a display apparatus which is capable of displaying a 3D image by adjusting for inconsistencies of an image and a method for processing an image thereof.

According to an aspect of an exemplary embodiment, there is provided a method for processing an image in a display apparatus, the method including: receiving a frame image, including a first image and a second image, and sync information of the frame image, determining whether the frame image is inconsistent with a reference pattern using the sync information, and if the frame image is inconsistent with the reference pattern, adjusting the frame image based on a level of inconsistency.

The frame image and the sync information may be received through analog interface.

The analog interface may be one of a composite interface, an s-video interface, and a component interface.

The method may further include displaying a test pattern having a same sync as the frame image along with the reference pattern.

The method may further include receiving a user's command to adjust for the level of inconsistency, and the adjusting may include adjusting the frame image according to the user's command.

The adjusting may include changing at least one of a location and a size of the frame image.

The test pattern may be displayed overlapped with the reference pattern.

The displaying may include displaying the test pattern and the reference pattern in different colors from each other.

The method may further include converting the first image and the second image, and displaying the converted first and second images along with the reference pattern.

The first image may be a left eye image and the second image may be a right eye image, and the display apparatus may display a 3D image.

According to an aspect of another exemplary embodiment, there is provided a display apparatus including: a display unit, a receiving unit which receives a frame image including a first image and a second image and sync information of the frame image, a determination unit which determines whether the frame image is inconsistent with a reference pattern using the sync information, an image processing unit which, if the frame image is inconsistent with the reference pattern, adjusts the frame image based on a level of inconsistency, and a controlling unit which controls the display unit to display the adjusted frame image.

The frame image and the sync information may be received through analog interface.

The analog interface may be one of a composite interface, an s-video interface, and a component interface.

The controlling unit may control the display unit to display a test pattern having a same sync as the frame image along with the reference pattern.

The apparatus may further include a user input unit which receives a user's command to adjust for the level of inconsistency, and the controlling unit may control the image processing unit to adjust the frame image according to the user's command.

The controlling unit may control the image processing unit to change at least one of a location and a size of the frame image.

The test pattern may be displayed overlapped with the reference pattern.

The controlling unit may control the display unit to display the test pattern and the reference pattern in different colors from each other.

The controlling unit may control the display unit to convert the first image and the second image, and display the converted first and second images along with the reference pattern.

The first image may be a left eye image and the second image may be a right eye image, and the display apparatus may display a 3D image.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
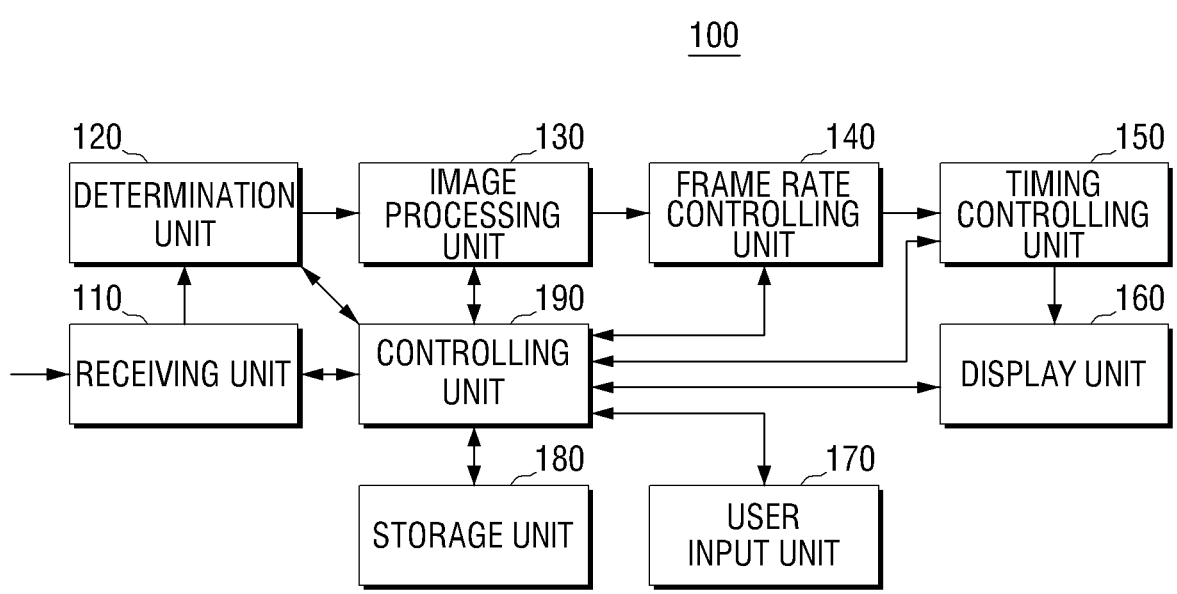
FIG. 1 is a view illustrating a display apparatus according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the disclosure with unnecessary detail.

FIG. 1 is a view illustrating a display apparatus according to an exemplary embodiment.

Referring to FIG. 1, the display apparatus 100 comprises a receiving unit 110, a determination unit 120, an image processing unit 130, a frame rate controlling unit 140, a timing controlling unit 150, a display unit 160, a user input unit 170, a storage unit 180, and a controlling unit 190.

The receiving unit 110 receives an image and sync information regarding the image through various interfaces.

The receiving unit 110 receives a frame image including a first image and a second image. The first image may be a left eye image and the second image may be a right eye image. In another exemplary embodiment, the first image may be an upper image and the second image may be a lower image. In addition, the first image and the second image may constitute a single frame.

The receiving unit 110 may receive an image having a format for reproducing a 3D image on the display unit 160.

The sync information includes a vertical sync signal and a horizontal sync signal.

Herein, the interface may be an analog interface such as composite interface, S-Video interface or component interface.

The determination unit 120 determines whether a frame image does not conform to a reference pattern.

Since the frame image is received from the receiving unit 120 through an analog interface, the frame image may not conform to a reference pattern.

The reference pattern refers to a preset pattern to determine whether there is an inconsistency on the screen of the display apparatus 100.

A frame image that is "consistent" represents a state where a received frame image is screen-fit for the screen of the display apparatus 100, and frame image that is "inconsistent" represents a state where a received frame image is not screen-fit for the screen of the display apparatus 100, and thus has at least one inconsistency.

If a frame image does not conform to a reference pattern, the image processing unit 130 adjusts the frame based on the inconsistency level.

Specifically, if the determination unit 120 determines that a frame image does not conform to a reference pattern, the image processing unit 130 calculates a level of inconsistency and adjusts the frame image based on the calculated level of inconsistency.

The operation of adjusting a frame image includes moving the location of the frame image and/or scaling the frame image to change the size of the frame image.

The image processing unit 130 may perform various types of image-processing which improve image quality.

The frame rate controlling unit 140 inserts duplicate images in the image signal so that each of the first image and the second image are repeated two times.

The timing controlling unit 150 controls a timing of an image output to the display unit 160 by converting one of the repeated images output from the frame rate controlling unit 140 into a black image.

The display unit 160 displays an image. Specifically, the display unit 160 may display an adjusted frame image.

The display unit 160 may display various menu screens or a pop-up window for receiving a user's command.

The display unit may display a test pattern having the same sync information as a frame image. Specifically, the display unit 160 may display a test pattern along with a reference pattern. In this case, the test pattern may be displayed overlapped with the reference pattern.

The display unit 160 may display the test pattern and the reference pattern in a different form from each other. For example, the display unit 160 may display the test pattern and the reference pattern to have different color from each other. Alternatively, the display unit 160 may display one of the test pattern and the reference pattern outlined thickly and the other one of the test pattern and the reference pattern outlined thinly. The display unit 160 may display the test pattern first and then display the reference pattern later after a preset time period elapses so that the reference pattern is overlapped with the test pattern. The display unit 160 may also display one of the test pattern and the reference pattern to be turned on and off at predetermined time intervals.

Alternatively, the display unit 160 may not display a test pattern having the same sync information as the frame image, and may display the frame image along with the reference pattern. In this case, the frame image may be displayed overlapped with the reference pattern.

The display unit 160 may have a touch screen function. Therefore, the display unit 160 may also perform the operation of the user input unit 170 which receives a user's command.

The user input unit 170 receives a user's command for adjusting the level of inconsistency. Specifically, the user input unit 170 receives a user's command from a manipulation panel formed on one portion of the display apparatus 100 or from a touch screen (i.e., display unit 160).

For example, a user's command to change the location and/or the size of a frame image may be received by manipulating the various buttons (keys) of a manipulation panel or the various buttons (keys) displayed on the touch screen.

The storage unit 180 stores sync information including an image received from the outside source, vertical sync signal and a horizontal sync signal. The storage unit 180 stores a reference pattern, various types of test patterns, and various time information which include information regarding a time for turning on or off a test pattern and a time for displaying a test pattern after the reference pattern is displayed.

In addition, the storage unit 180 may store information regarding a reference point or a reference line. In this case, the information regarding the reference point or the reference line may be included in the sync information. Alternatively, the information regarding a reference point or a reference line may be extracted or calculated from the sync information.

The controlling unit 190 controls the overall operation of components 110-180. Specifically, the controlling unit 190 controls the display unit 160 to display a frame image adjusted by the image processing unit 130. The controlling unit 190 controls the display unit 160 to display a test pattern having the same sync information as a frame image along with a reference pattern.

The controlling unit 190 controls the display unit 160 to convert the first image and the second image, and display the converted first and second images along with a reference pattern.

In addition, the controlling unit 190 controls the image processing unit 130 to adjust a frame image according to a user's command.

Alternatively, unlike the above illustration, the frame rate controlling unit 140 and the timing controlling unit 150 may be included in the image processing unit 130.

According to the present display apparatus 100, even if there is an inconsistency in an image received through analog interface, the image may be easily adjusted. As a result, it is possible to display an image received through analog interface as a 3D image.

Figure 2:
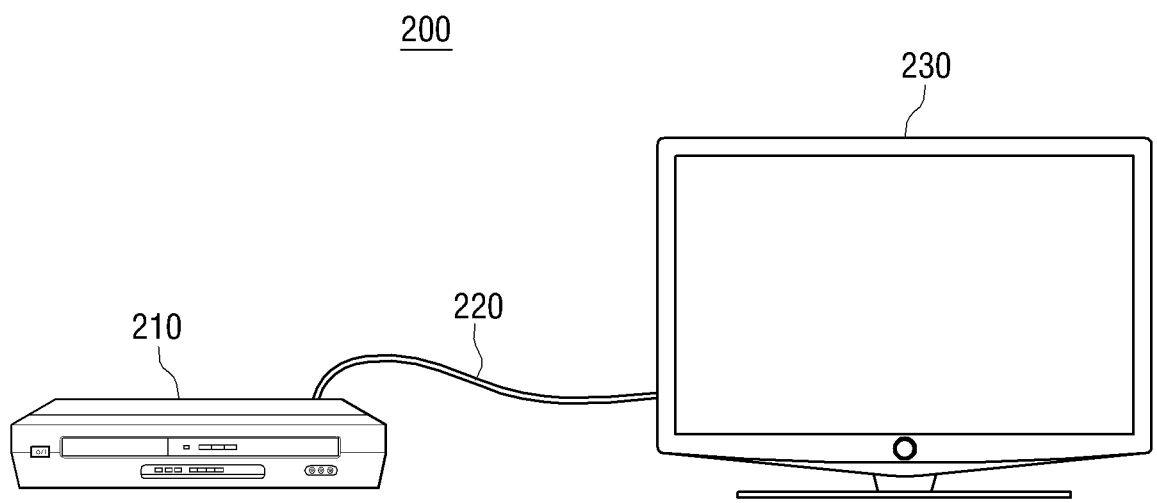
FIG. 2 is a view illustrating an example of a display system.

FIG. 2 is a view illustrating an example of a display system.

Referring to FIG. 2, a display system comprises an external apparatus 210, interface 220, and a display apparatus 230.

The display apparatus 230 may be connected to the external apparatus 210 through the interface 220. Specifically, the interface 220 may be analog interface 220 such as a composite interface, an s-video interface, and a component interface.

The external apparatus 210 may include a set-top box, a digital versatile disk player (DVDP), or a Blu-ray disk player.

Even if the external apparatus 210 transmits a frame image with no inconsistency to the display apparatus 230, there could be an inconsistency in a frame image received from the display apparatus 230 through the analog interface 220.

Accordingly, even though a frame image for displaying a 3D image is received from the display apparatus 230 through the analog interface 220, the display apparatus 230 may adjust the received image for an image received from the display apparatus 230 through the analog interface 220 as a 3D image.

FIGS. 3A to 3D are views to explain the image processing operation of the display apparatus.

Figure 3A:
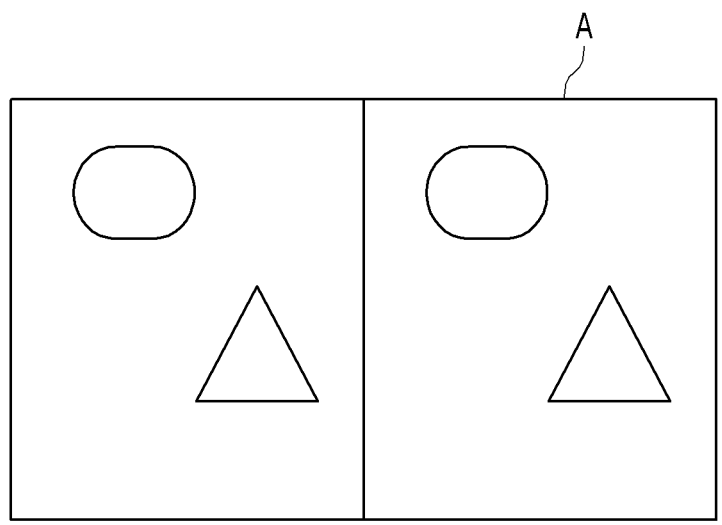
FIGS. 3A to 3D are views to explain the image processing operation of the display apparatus.

The display unit 160 may display a frame image (A) including a left eye image and a right eye image as illustrated in FIG. 3A. In order to display a 3D image, the left eye image is the same as the right eye image.

Figure 3B:
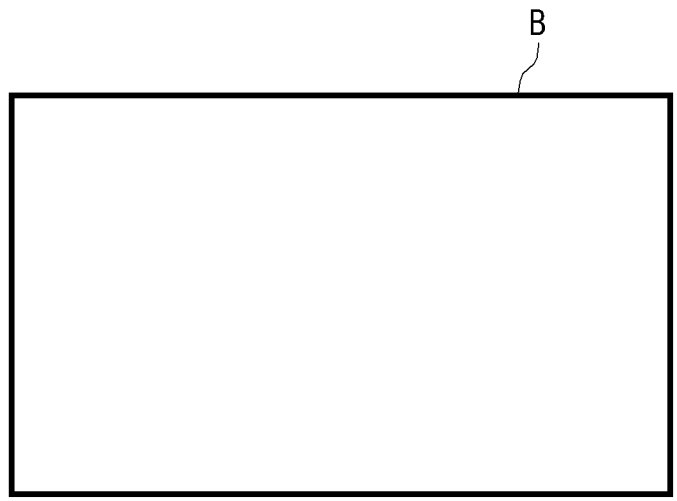

In addition, the display unit 160 may display a reference pattern (B) as illustrated in FIG. 3B.

The left eye image and the right eye image display the same image in order to display a 3D image.

If the determination unit 120 determines that there is an inconsistency in a frame image (A) while a television is turned on, or when an event for connecting an external apparatus to the display apparatus 100 through an analog interface occurs, the display unit 160 may display that there is an inconsistency (i.e., a mismatching) in a pop-up window.

In addition, the display unit 160 may display that there is an inconsistency in a received image and a message for asking whether to perform an adjustment in a pop-up window.

Figure 3C:
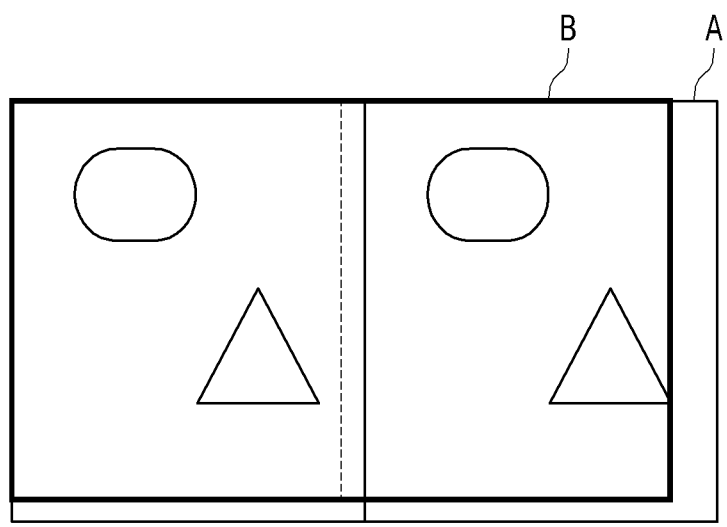

If a user's command to perform an adjustment is received through the user input unit 170, the frame image (A) and the reference pattern (B) may be displayed as being overlapped with each other as illustrated in FIG. 3C.

Figure 3D:
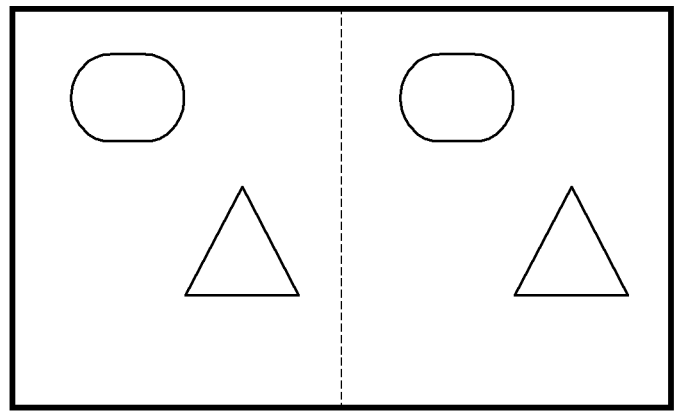

Subsequently, according to a user's command of the user input unit 170, the image processing unit 130 may adjust the image into an image without, the inconsistency by changing the size of the frame image (A) to be consistent with a reference pattern as illustrated in FIG. 3D.

Accordingly, the display apparatus 100 may display an image as a 3D image.

Figure 4A:
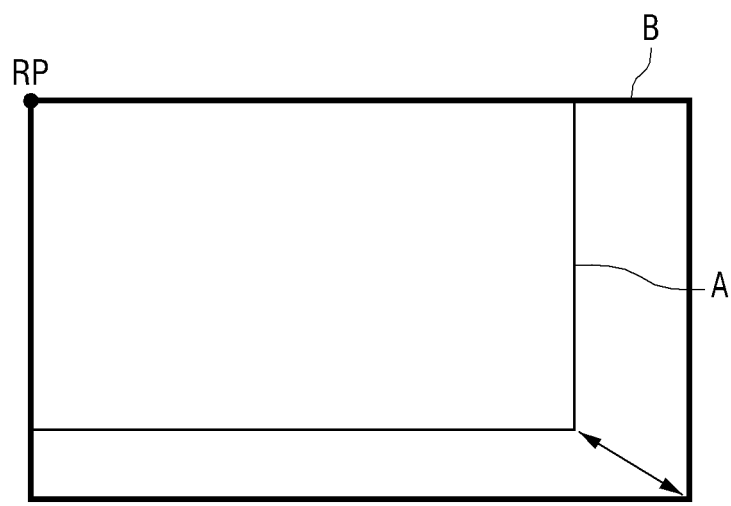
FIGS. 4A to 4C are views illustrating examples of various frame images having at least one inconsistency.
Figure 4B:
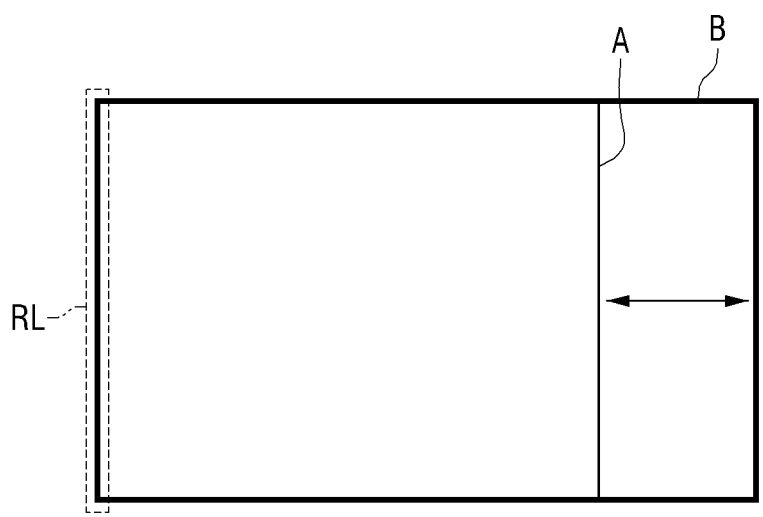
Figure 4C:
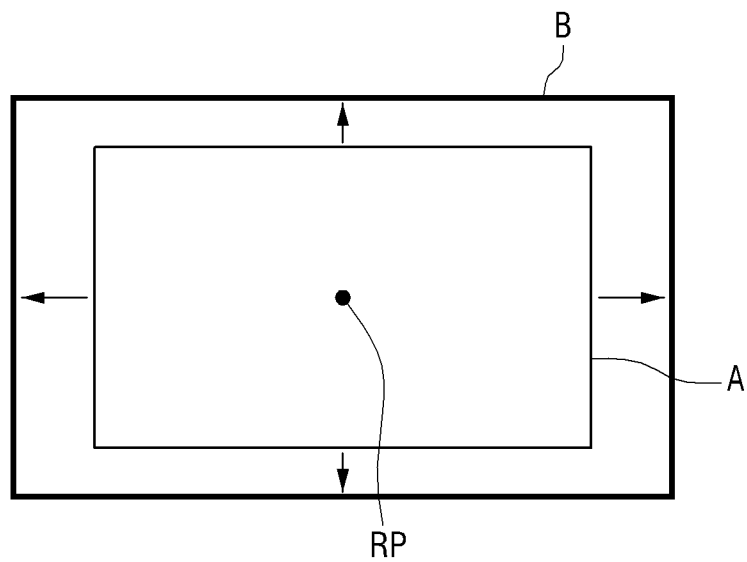

FIGS. 4A to 4C are views illustrating examples of various frame images having at least one type of inconsistency.

Referring to FIG. 4A, the display unit 160 may display a frame image (A) of which a length and a width are shorter than a reference pattern (B). In this case, a user may adjust the frame image (A) to be consistent with the reference pattern (B) using a manipulation panel or an up-down-left-right scaling button formed on one portion of the display unit 160. For example, the user may define an area by moving an outline of a desired scaled frame image using the manipulation panel or the up-down-left-right scaling button formed on one portion of the display unit 160.

Subsequently, if a user presses a manipulation panel or a compensation completion button formed on one portion of the display unit 160, the image processing unit 130 may calculate the degree of inconsistency between the frame image (A) and the scaled frame image and perform scaling on the frame image (A) to match the size and/or position of the scaled framed image.

In this case, the image processing unit 130 may perform scaling on the frame image (A) in a left and right direction or in an up and down direction with respect to a reference point (RP), using an RP included in or extracted from sync information. For example, the user may define an area by moving an outline of a desired scaled frame image using the manipulation panel or the up-down-left-right scaling button formed on one portion of the display unit 160.

Referring to FIG. 4B, the display unit 160 may display a frame image (A) of which a width is shorter than a reference pattern (B). In this case, a user may adjust the frame image (A) to be consistent with the reference pattern (B) using a manipulation panel or a left and right scaling button formed on one portion of the display unit 160.

Subsequently, if a user's command to notify compensation completion is input from the user input unit 170, the image processing unit 130 may calculate the degree of inconsistency between the frame image (A) and a scaled frame image and perform scaling on the frame image (A) to match the size and/or position of the scaled framed image.

In this case, the image processing unit 130 may perform scaling on the frame image (A) in a left and right direction with respect to a reference line (RL) using an RL included in or extracted from sync information.

Referring to FIG. 4C, the display unit 160 may display a frame image (A) included in the inside of a reference pattern (B). In this case, a user may adjust the frame image (A) to be consistent with the reference pattern (B) using a manipulation panel or an up-down-left-right scaling button formed on one portion of the display unit 160. For example, the user may define an area by moving an outline of a desired scaled frame image using the manipulation panel or the up-down-left-right scaling button formed on one portion of the display unit 160.

Alternatively, a user may adjust the frame image (A) to be consistent with the reference pattern (B) using a location movement button and an up-down-left-right scaling button formed on one portion of the display unit 160.

Subsequently, if a user presses a manipulation panel or a compensation completion button formed on one portion of the display unit 160, the image processing unit 130 may calculate the degree of inconsistency between the frame image (A) and a scaled frame image and perform scaling on the frame image (A) to match the size and/or position of the scaled framed image.

In this case, the image processing unit 130 may perform scaling on the frame image (A) in a left and right direction or in an up and down direction with respect to a reference point (RP), using an RP included in or extracted from sync information.

In FIGS. 4A to 4C, the frame image (A) is not divided into a left eye image and a right eye image for convenience of explanation.

In addition, FIGS. 4A to 4C illustrate an example of various inconsistencies where the frame image (A) is smaller than the reference pattern (B), but this is only an example. The present invention is not limited thereto.

Figure 5A:
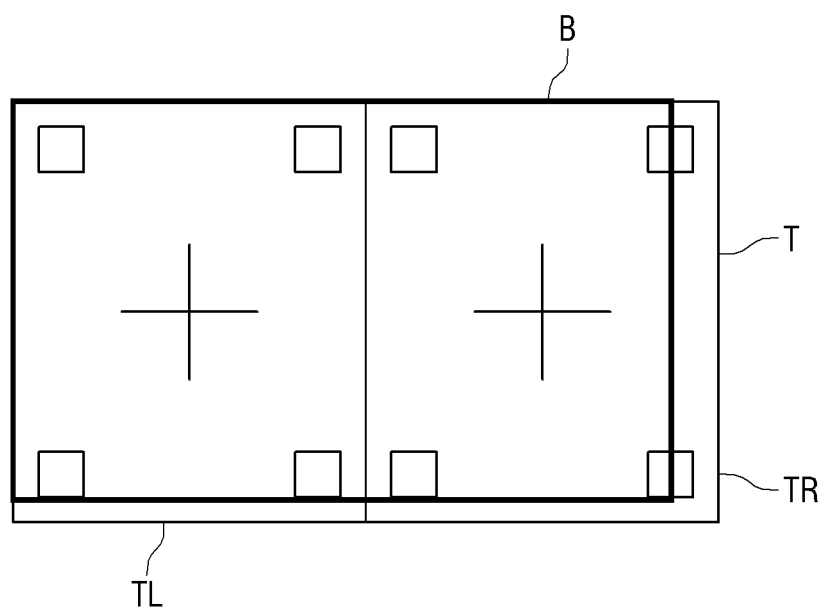
FIGS. 5A to 5C are views illustrating examples of performing image processing using a test pattern according to an exemplary embodiment.
Figure 5B:
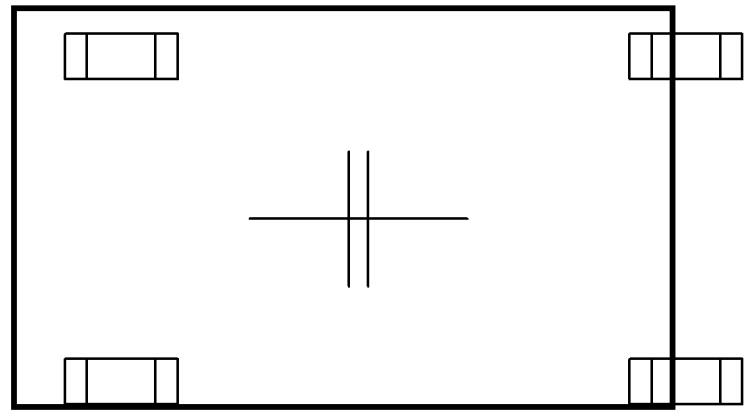
Figure 5C:
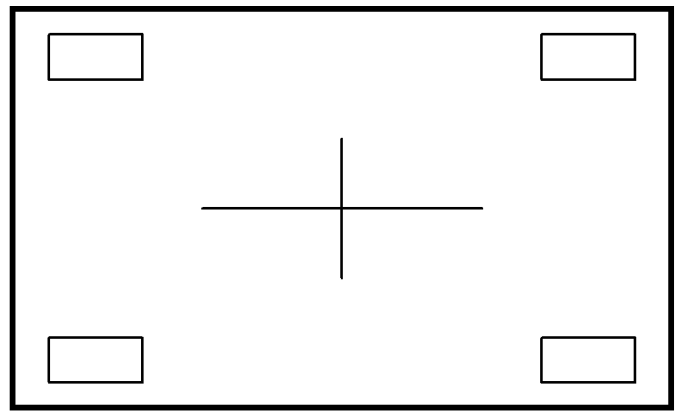

FIGS. 5A to 5C are views illustrating examples of performing image processing using a test pattern.

Referring to FIG. 5A, the display unit 160 may display a test pattern (T) having the same sync as a frame image. For example, the test pattern of a left eye image (TL) may include a cross mark at its center and a small-sized quadrangle at each corner. The test pattern of a left eye image (TL) is the same as the test pattern of a right eye image (TR).

In addition, the display unit 160 may display a test pattern (T) along with a reference pattern (B). In this case, the test pattern (T) may be overlapped with the reference pattern (B). As illustrated in FIG. 5A, the display unit 160 may display a test pattern of which length and width are extended in comparison with the reference pattern (B).

If the controlling unit 130 performs various types of processing on the test pattern (T) similar to the way the received frame image (A) sequentially goes through the image processing unit 130, the frame rate controlling unit 140 and the timing controlling unit 150 for being displayed as a 3D image by the display unit 160, the display unit 160 may display the processed test pattern along with the reference pattern (B) as illustrated in FIG. 5B.

A user may adjust a changed test pattern to be consistent with the reference pattern (B) using at least one of a manipulation panel, a location movement button and an up-down-left-right scaling button formed on one portion of the display unit 160, as shown in FIG. 5C.

The image processing unit 130 may calculate the degree of inconsistency between the test pattern (T) and the changed test pattern and perform scaling on the frame image (A) according to the parameters of the changed test pattern.

However, the form of a test pattern is not limited to the above illustration.

Figure 6:
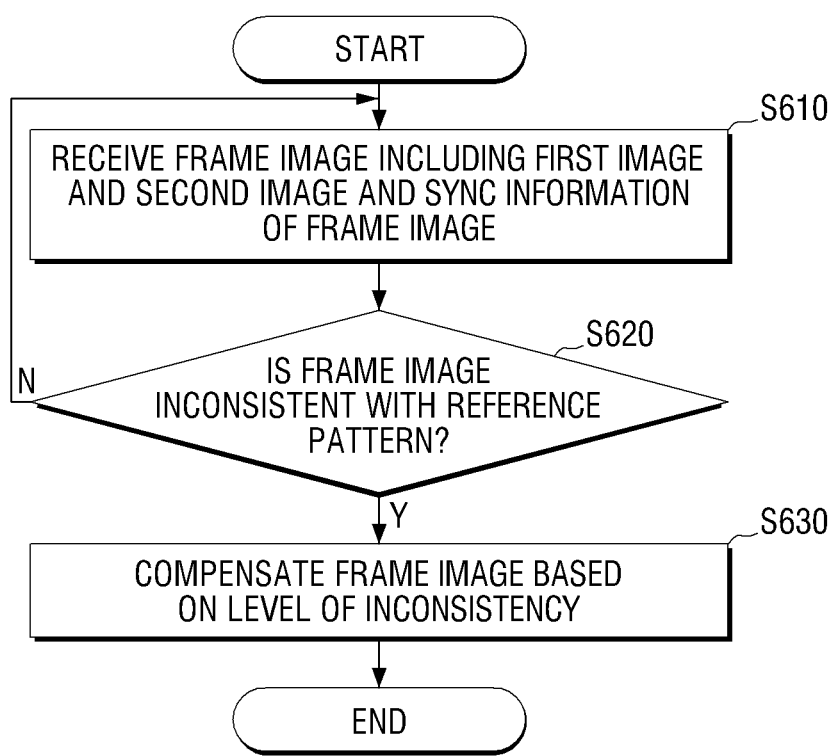
FIG. 6 is a flowchart illustrating the image processing method of a display apparatus according to an exemplary embodiment.

FIG. 6 is a flowchart illustrating the image processing method of a display apparatus according to an exemplary embodiment.

Referring to FIG. 6, the receiving unit 110 receives a frame image, including the first image and the second image, and the sync information of the frame image (S610).

The determination unit 120 determines whether the frame image is consistent with a reference pattern using the sync information (S620).

If the frame image is not consistent with the reference pattern, the image processing unit 130 adjusts the frame image based on the level of inconsistency (S630).

The image processing method of a display apparatus may further include displaying a test pattern having the same sync as a frame image along with a reference pattern.

In addition, the image processing method of a display apparatus may further include receiving a user's command to adjust for an inconsistency.

In addition, the image processing method of a display apparatus may further include converting the first image and the second image, and displaying the converted first and second images along with a reference pattern.

Hereinafter, overlapped description will not be provided.

Although a few exemplary embodiments have been shown and described, it would be appreciated by those skilled in the art that changes may be made in the exemplary embodiments without departing from the principles and spirit of the general inventive concept, the scope of which is defined in the claims and their equivalents.

What is claimed is:

1. A method for processing an image in a display apparatus, the method comprising:
   displaying an image received through an analog interface;
   displaying a reference image comprising a first area and a second area, the reference image indicating that a first portion of the image corresponding to the first area is to be displayed as a left-eye image of a three-dimensional image and a second portion of the image corresponding to the second area is to be displayed as a right-eye image of the three-dimensional image;
   changing at least one of a location and a size of the image according to a user command so that a center line of the image corresponds with a center line of the reference image and features of the left-eye image are matched to features of the right-eye image;
   extracting the left-eye image and the right-eye image from the image of which at least one of a location and a size is changed; and
   displaying the extracted left-eye image and right-eye image,
   wherein the reference image is displayed overlapped with the image.

2. The method as claimed in claim 1, wherein the analog interface is one of a composite interface, an s-video interface, and a component interface.

3. The method as claimed in claim 1, wherein the user command is a command to change at least one of a location and a size of the image to adjust an inconsistency between the image and the reference image.

4. The method as claimed in claim 1, wherein the displaying the reference image comprises displaying the image and the reference image in different colors from each other.

5. The method as claimed in claim 1, wherein the displaying the reference image comprises displaying the image and the reference image in different thicknesses from each other.

6. The method as claimed in claim 1, wherein the displaying the reference image comprises displaying one of the image and the reference image to be turned on and off at a predetermined time intervals.

7. The method as claimed in claim 1, wherein the displaying the reference image comprises replacing the image with a test image having a sync that is the same as the image and displaying the test image.

8. The method as claimed in claim 1, further comprising:
  determining whether the image is inconsistent with the reference image, by using sync information received along with the image; and
  displaying, in response to it being determined that the image is inconsistent with the reference image, the inconsistency of the image on a pop-up window.

9. A display apparatus comprising;
  a user input unit;
  an image processing unit;
  a receiving unit configured to receive an image through an analog interface;
  a display unit configured to display the image; and
  a controller configured to control the display unit to display a reference image comprising a first area and a second area, the reference image indicating that a first portion of the image corresponding to the first area is to be displayed as a left-eye image of a three-dimensional image and a second portion of the image corresponding to the second area is to be displayed as a right-eye image of the three-dimensional image, control the image processing unit to change at least one of a location and a size of the image according to a user command received through the user input unit so that a center line of the image corresponds with a center line of the reference image and features of the left-eye image are matched to features of the right-eye image, to extract the left-eye image and the right-eye image from the image of which at least one of a location and a size is changed, and control the display unit to display the extracted left-eye image and right-eye image,
  wherein the controller is further configured to control the display unit to display the reference image overlapped with the image.

10. The apparatus as claimed in claim 9, wherein the analog interface is one of a composite interface, an s-video interface, and a component interface.

11. The apparatus as claimed in claim 9, wherein the user input unit is configured to receive the user command to change at least one of a location and a size of the image to adjust an inconsistency between the image and the reference image.

12. The apparatus as claimed in claim 9, wherein the controller is further configured to control the display unit to display the image and the reference image in different colors from each other.

13. The apparatus as claimed in claim 9, wherein the controller is further configured to control the display unit to display the image and the reference image in different thicknesses from each other.

14. The apparatus as claimed in claim 9, wherein the controller is further configured to control the display unit to display one of the image and the reference image to be turned on and off at a predetermined time intervals.

15. The apparatus as claimed in claim 9, wherein the controller is further configured to control the display unit to replace the image with a test image having a sync that is the same as the image and replace the test image.

16. The apparatus as claimed in claim 9 further comprising:
  a determination unit configured to determine whether the image is inconsistent with the reference image, by using sync information received along with the image,
  wherein the controller is further configured to, in response to it being determined that the image is inconsistent with the reference image, control the display unit to display the inconsistency of the image on a pop-up window.

* * * * *